US012762948B1

(12) United States Patent
Adams

(10) Patent No.: US 12,762,948 B1
(45) Date of Patent: Oct. 13, 2026

(54) REMOTELY CONTROLLED TRAFFIC SAFETY SIGNS

(71) Applicant: Stephen B. Adams, Heath Springs, SC (US)

(72) Inventor: Stephen B. Adams, Heath Springs, SC (US)

( * ) Notice: Subject to any disclaimer, the term of this patent is extended or adjusted under 35 U.S.C. 154(b) by 209 days.

(21) Appl. No.: 18/109,488

(22) Filed: Feb. 14, 2023

(51) Int. Cl.
*G08G 1/07* (2006.01)
*G08C 17/00* (2006.01)
*H04N 7/18* (2006.01)

(52) U.S. Cl.
CPC ............... *G08G 1/07* (2013.01); *G08C 17/00* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 3,729,706 A | 4/1973 | Hein | |
| 3,867,718 A | 2/1975 | Moe | |
| 5,422,638 A | 6/1995 | Singer | |
| 5,493,292 A | 2/1996 | Fanslow | |
| 5,959,554 A | 9/1999 | Armstrong | |
| 6,052,067 A | 4/2000 | Nuxoll | |
| 6,104,313 A * | 8/2000 | Boyd, II | E01F 9/65 340/925 |
| 8,164,483 B1 | 4/2012 | Phillips | |
| D704,586 S | 5/2014 | Williams | |
| 9,601,012 B2 | 3/2017 | Williams | |
| 9,972,205 B2 | 5/2018 | Beaulieu | |
| 10,249,186 B2 * | 4/2019 | Campbell | G08G 1/0955 |
| 12,020,558 B2 * | 6/2024 | Cho | G08B 5/006 |

FOREIGN PATENT DOCUMENTS

| | | |
|---|---|---|
| WO | 0010147 | 2/2000 |

* cited by examiner

*Primary Examiner* — K. Wong
(74) *Attorney, Agent, or Firm* — Kyle A. Fletcher, Esq.

(57) ABSTRACT

The remotely controlled traffic safety signs may include a remotely controlled sign and a remote control. The remotely controlled sign may be placed at a transition area of a construction zone to control the flow of traffic in one direction. The remotely controlled sign may include a signaling mechanism that may present a STOP paddle or a SLOW paddle to oncoming traffic. Two or more remotely controlled signs may be deployed to reverse the flow of traffic over a single open lane of the construction zone. The remotely controlled signs may be controlled by the remote control from a remote location via a wireless link. As a non-limiting example, the remote location may be a computerized device within a stationary vehicle.

20 Claims, 8 Drawing Sheets

REMOTELY CONTROLLED TRAFFIC SAFETY SIGNS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of traffic safety and traffic control, more specifically, remotely controlled traffic safety signs.

SUMMARY OF INVENTION

The remotely controlled traffic safety signs may comprise a remotely controlled sign and a remote control. The remotely controlled sign may be placed at a transition area of a construction zone to control the flow of traffic in one direction. The remotely controlled sign may comprise a signaling mechanism that may present a STOP paddle or a SLOW paddle to oncoming traffic. Two or more remotely controlled signs may be deployed to reverse the flow of traffic over a single open lane of the construction zone. The remotely controlled signs may be controlled by the remote control from a remote location via a wireless link. As a non-limiting example, the remote location may be a computerized device within a stationary vehicle.

An object of the invention is to provide a remotely controlled traffic sign that is configured to control the flow of traffic over a lane of travel.

Another object of the invention is to provide a remote control that is operable to change the state of one or more remotely controlled traffic signs from a remote location.

A further object of the invention is to provide a remotely controlled traffic sign comprising a barrel and a signaling mechanism that rotates a crossbar to present a STOP paddle or a SLOW paddle.

Yet another object of the invention is to provide a remotely controlled traffic sign that comprises a camera and is operable to transmit still images and/or motion video from the remotely controlled traffic sign to the remote control.

These together with additional objects, features and advantages of the remotely controlled traffic safety signs will be readily apparent to those of ordinary skill in the art upon reading the following detailed description of the presently preferred, but nonetheless illustrative, embodiments when taken in conjunction with the accompanying drawings.

In this respect, before explaining the current embodiments of the remotely controlled traffic safety signs in detail, it is to be understood that the remotely controlled traffic safety signs is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the remotely controlled traffic safety signs.

It is therefore important that the claims be regarded as including such equivalent construction insofar as they do not depart from the spirit and scope of the remotely controlled traffic safety signs. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word “or” is intended to be inclusive.

Figure 1:
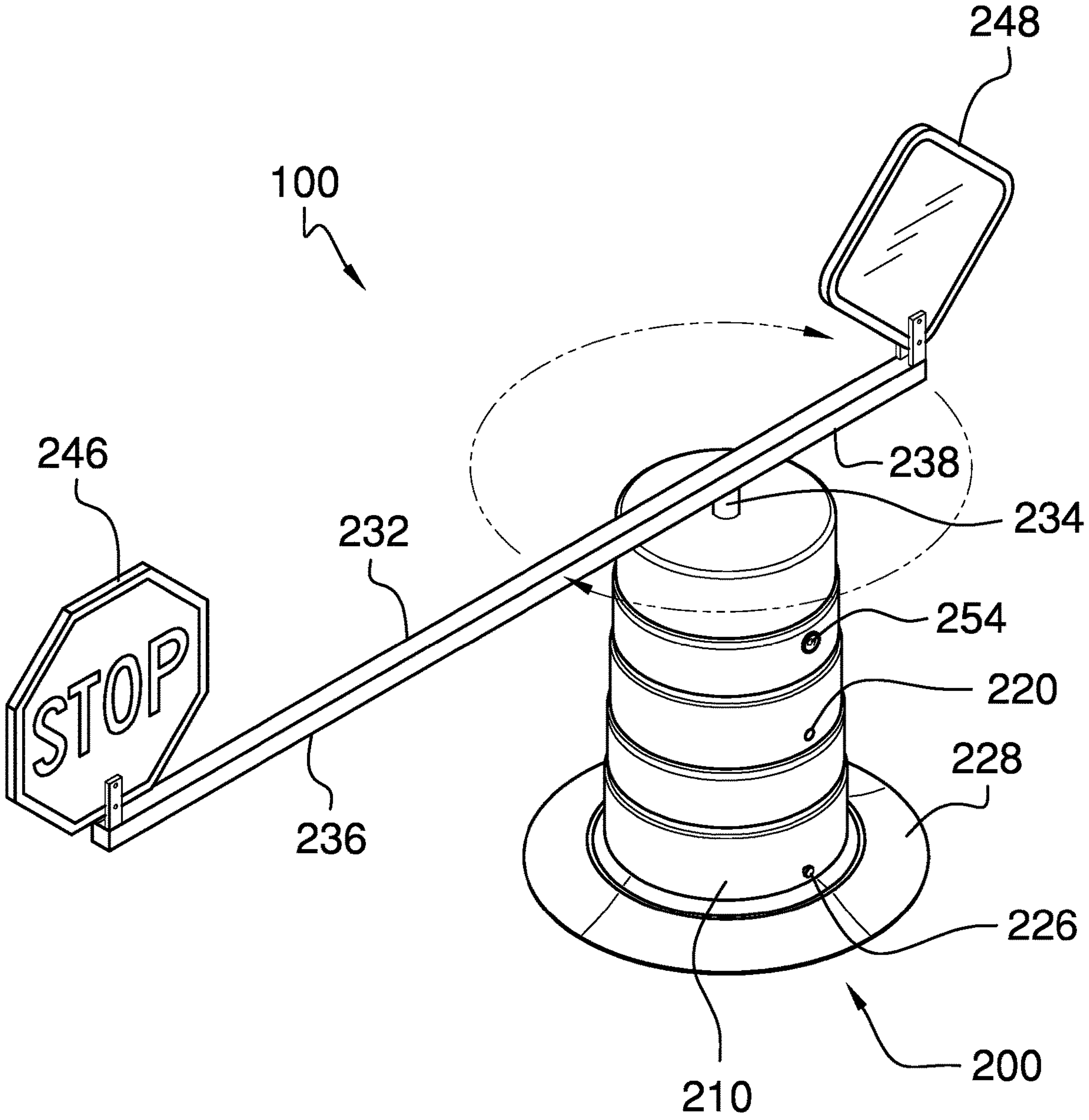
FIG. 1 is an isometric view of an embodiment of the disclosure.
Figure 2:
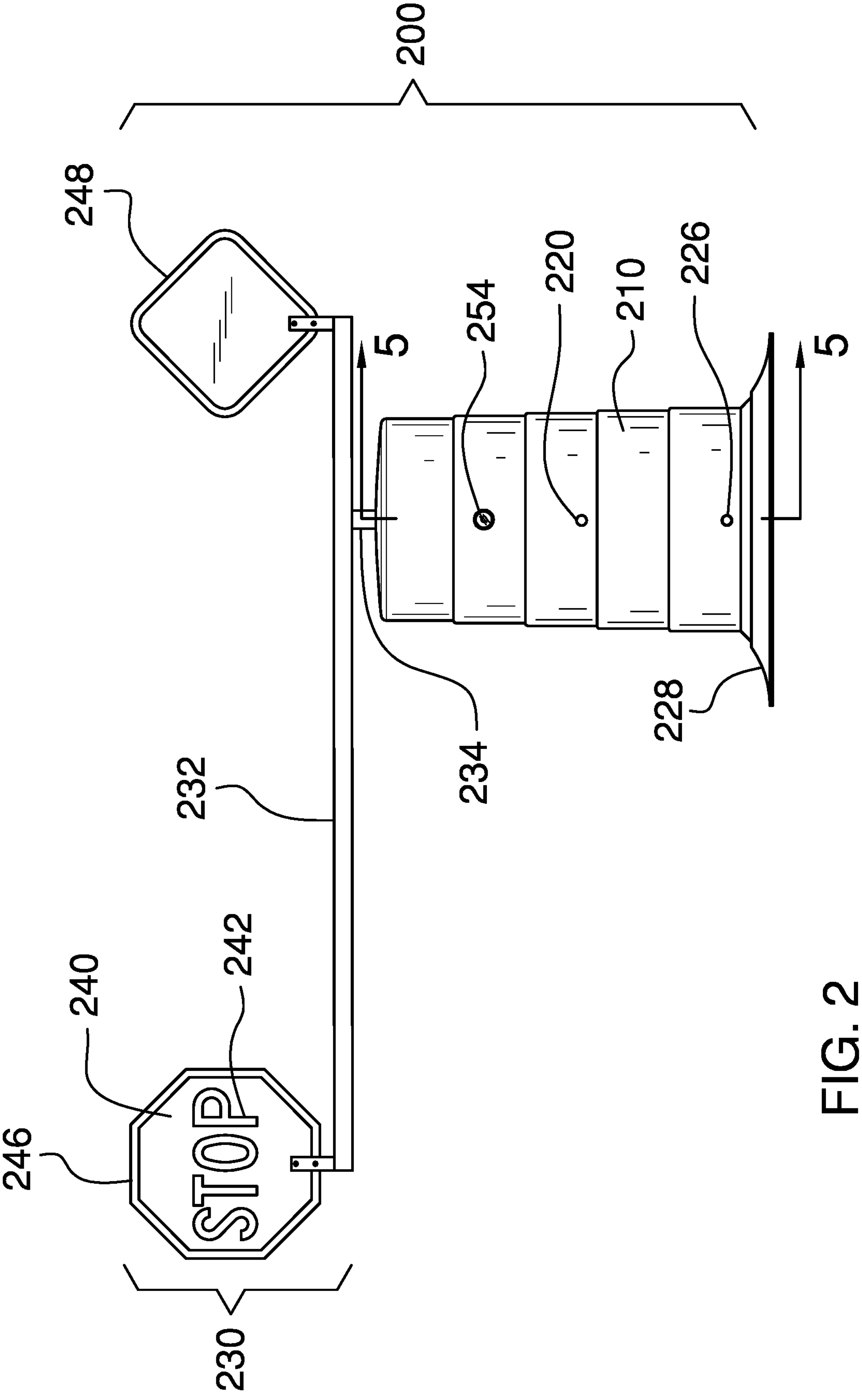
FIG. 2 is a front view of an embodiment of the disclosure.
Figure 3:
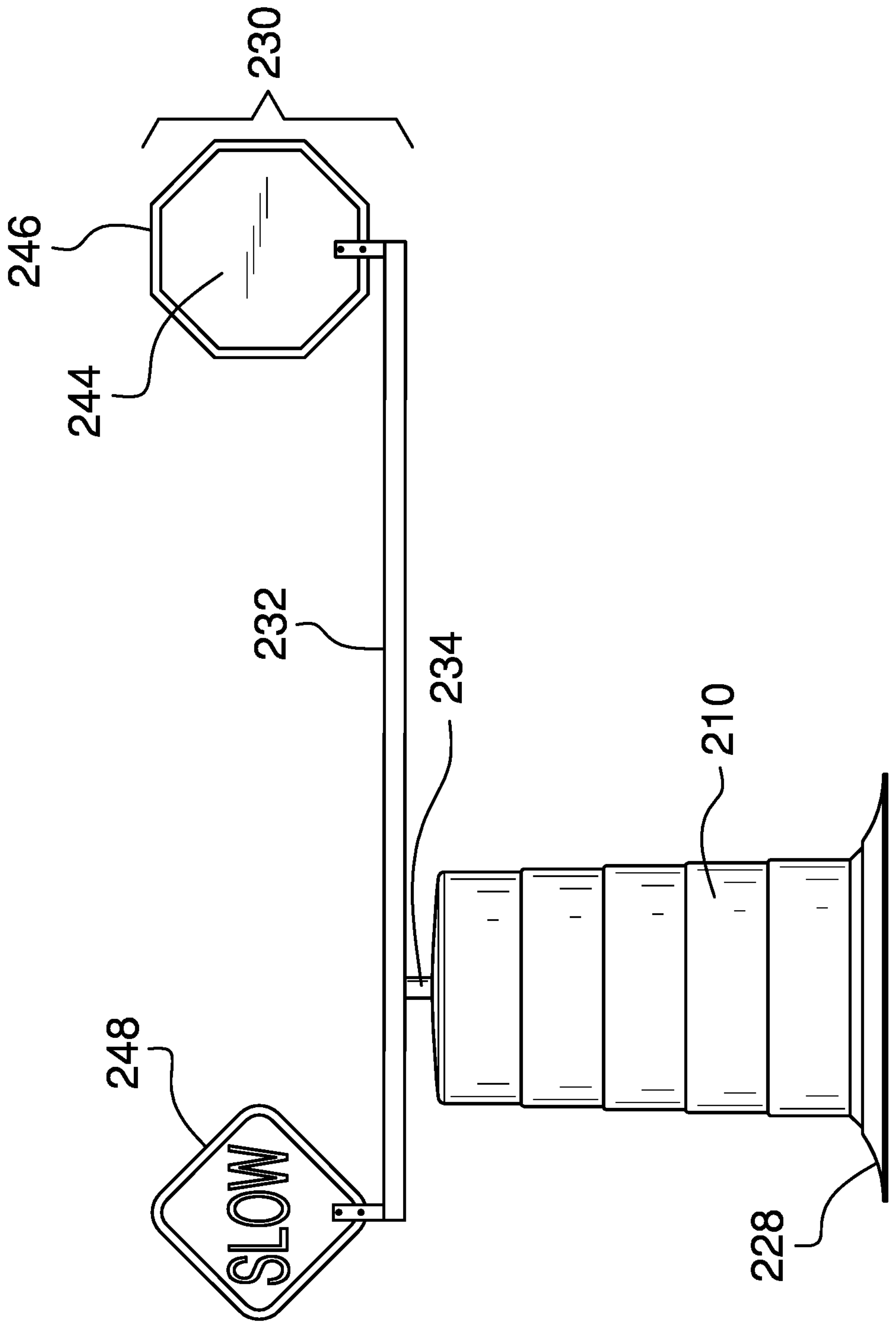
FIG. 3 is a rear view of an embodiment of the disclosure.
Figure 4:
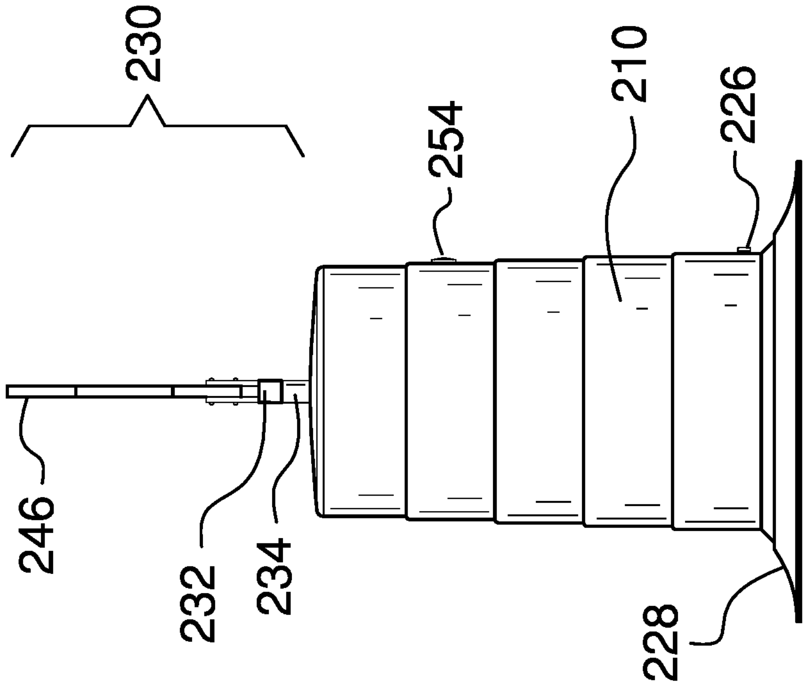
FIG. 4 is a side view of an embodiment of the disclosure.
Figure 5:
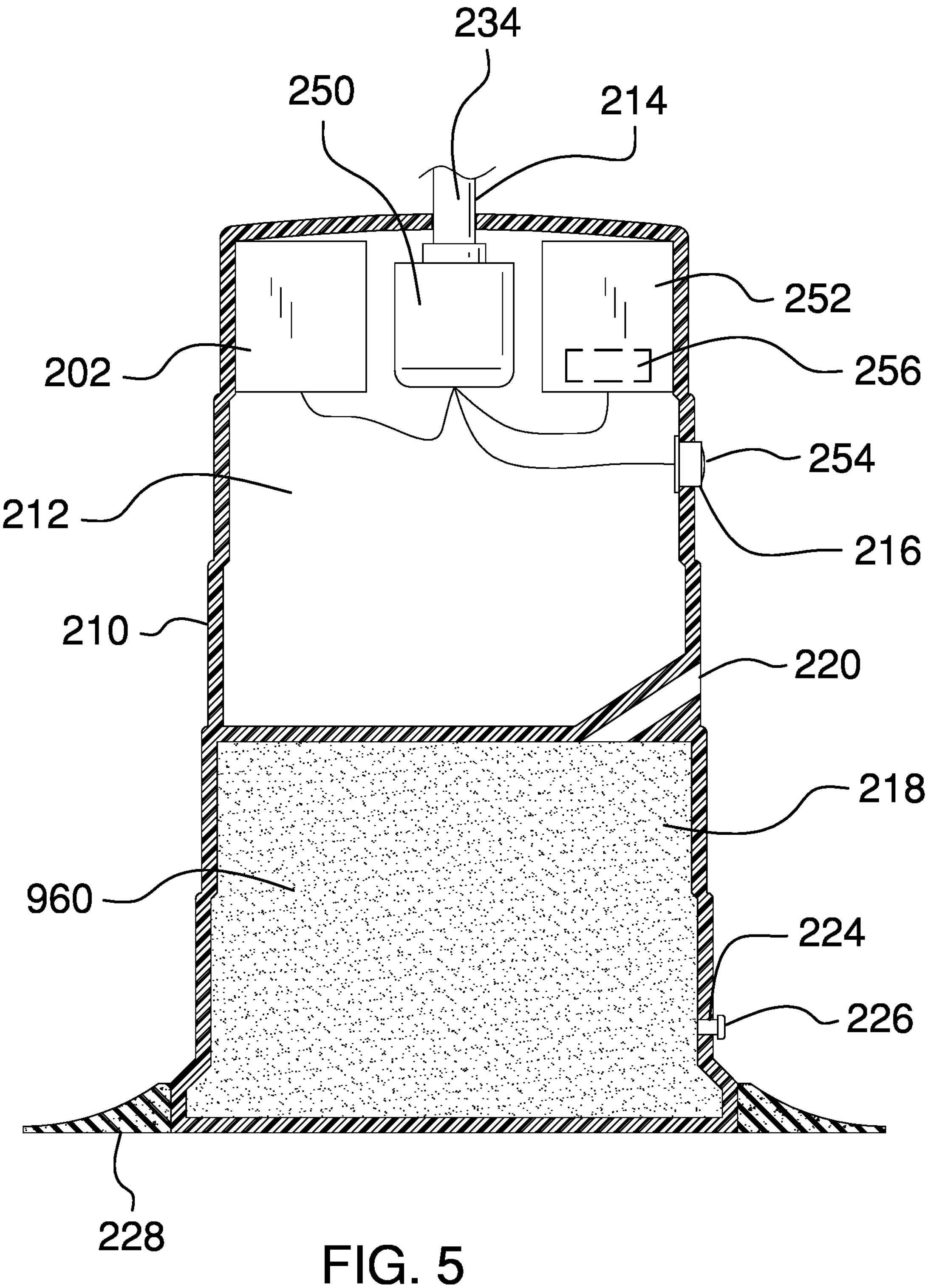
FIG. 5 is a cross-sectional view of an embodiment of the disclosure across 5-5 as shown in FIG. 2.
Figure 6:
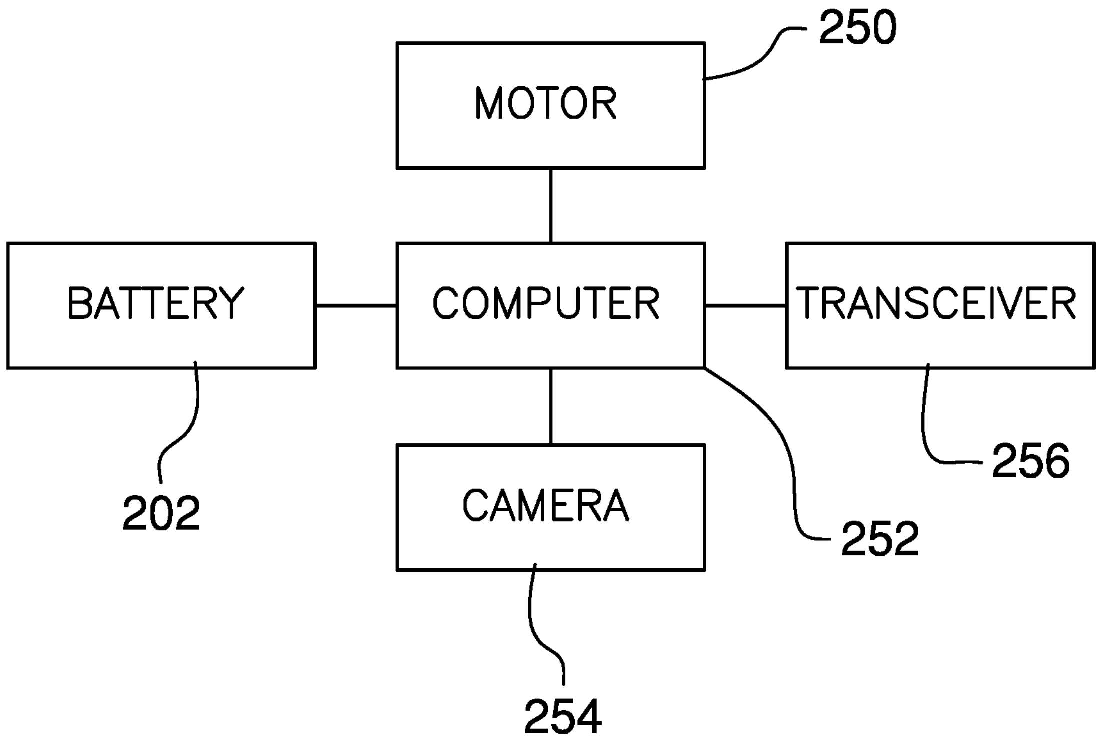
FIG. 6 is a block diagram of an embodiment of the disclosure.
Figure 7:
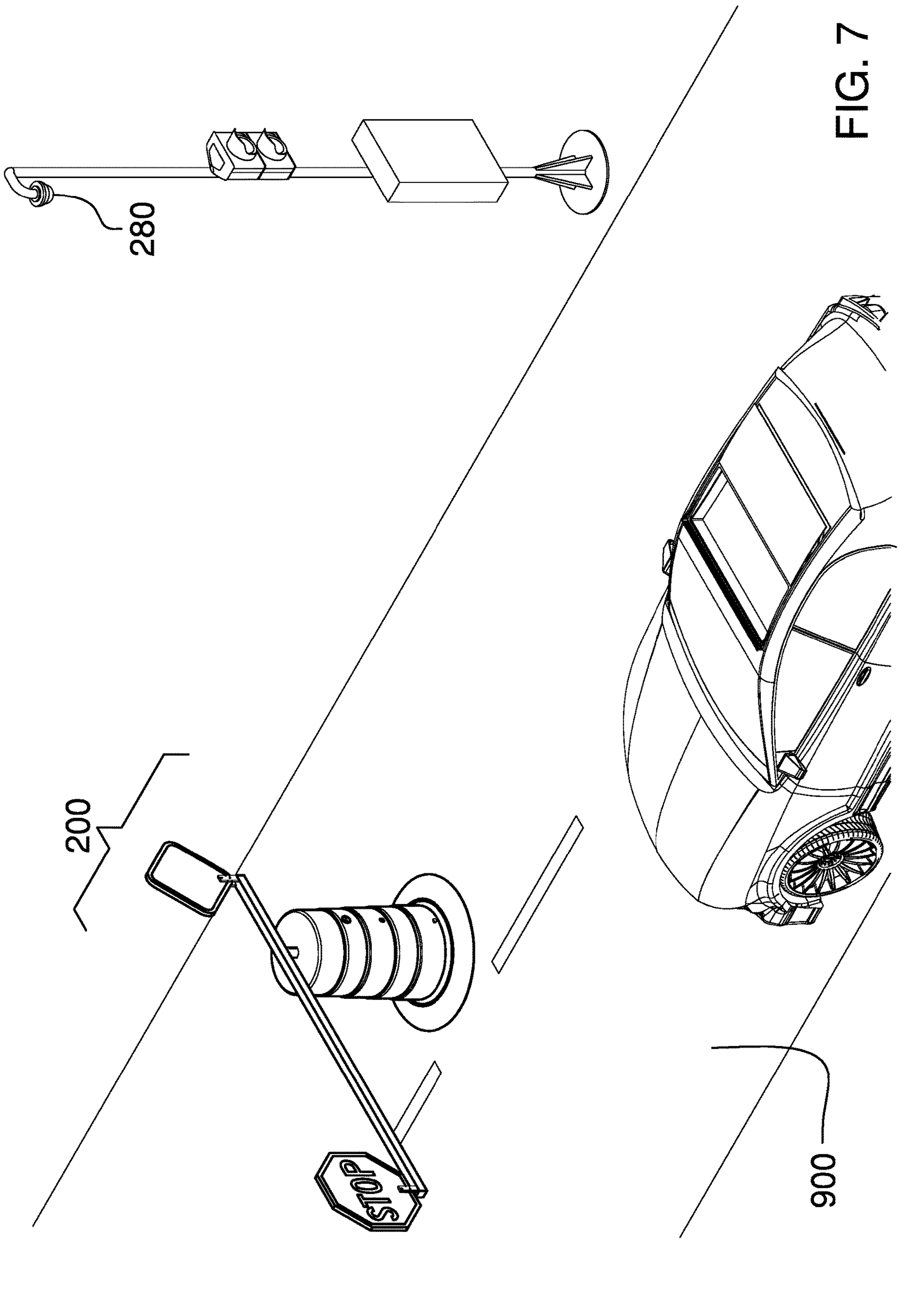
FIG. 7 is an in-use view of an embodiment of the disclosure.
Figure 8:
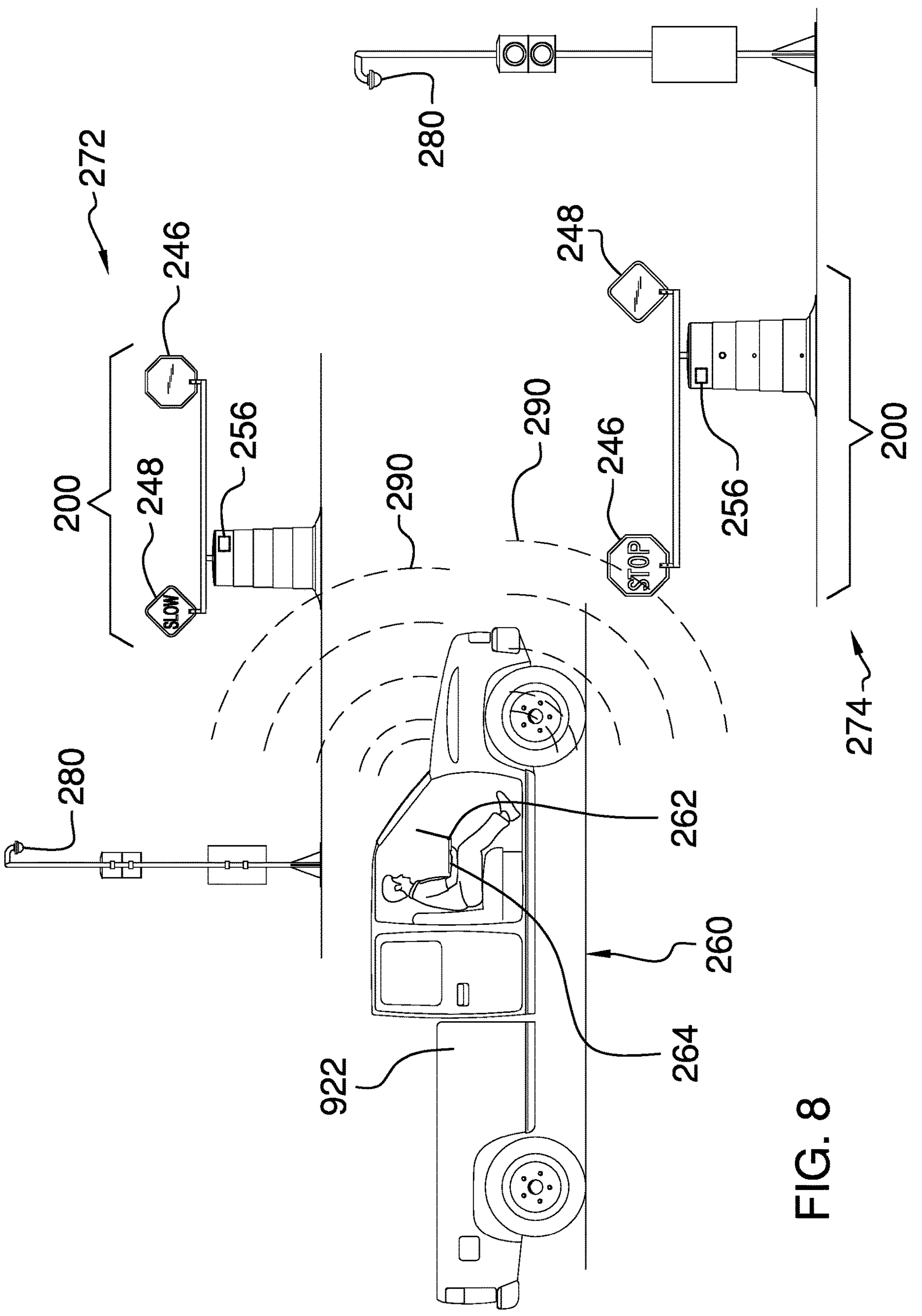
FIG. 8 is an in-use view of an embodiment of the disclosure, illustrating a remote control communicating to two remotely controlled traffic signs.

Detailed reference will now be made to a first potential embodiment of the disclosure, which is illustrated in FIGS. 1 through 8.

The remotely controlled traffic safety signs 100 (hereinafter invention) comprises a remotely controlled sign 200 and a remote control 260. The remotely controlled sign 200 may be placed at a transition area of a construction zone to control the flow of traffic in one direction. The remotely controlled sign 200 may comprise a signaling mechanism 230 that may present a STOP paddle 246 or a SLOW paddle 248 to oncoming traffic. Two or more remotely controlled signs may be deployed to reverse the flow of traffic over a single open lane of the construction zone. The remotely controlled signs 200 may be controlled by the remote control 260 from a remote location via a wireless link 290. As a non-limiting example, the remote location may be a computerized device 262 within a stationary vehicle 922.

The remotely controlled sign 200 may comprise a barrel 210, the signaling mechanism 230, a motor 250, a controller 252, a camera 254, a first transceiver 256, and one or more batteries 202. The signaling mechanism 230 may be located on the top of the barrel 210 and may be rotated by the motor 250 under control of the controller 252. The camera 254 may be adapted to provide a view of the oncoming traffic to a human flagger located at the remote location.

The barrel 210 may be a vertically-oriented cylindrical enclosure for the motor 250, the controller 252, the camera 254, the first transceiver 256, and the one or more batteries 202. The barrel 210 may internally comprise an equipment cavity 212 located at the top of the barrel 210 and a ballast cavity 218 located at the bottom of the barrel 210. The motor 250, the controller 252, the camera 254, the first transceiver 256, and the one or more batteries 202 and may be mounted within the equipment cavity 212. The ballast cavity 218 may be filled with ballast 960 to stabilize the barrel 210. As non-limiting examples, the ballast 960 may be sand or water. In some embodiments, the barrel 210 may be the shape of a construction barrel.

The top center of the barrel 210 may comprise a crossbar aperture 214 through which the signaling mechanism 230 may couple to the motor 250. The side of the barrel 210 may comprise a camera aperture 216 through which the camera 254 may view the oncoming traffic.

The top of the ballast cavity 218 may comprise a fill port through which the ballast 960 may be added to the ballast cavity 218. In some embodiments, the fill port 220 may be sealed by a fill plug during use. The bottom of the ballast cavity 218 may comprise a drain port 224 through which the ballast 960 may be removed from the ballast cavity 218. The drain port 224 may be sealed by a drain plug 226 during use.

In some embodiments, a barrel tire ring 228 may be operable to further stabilize the barrel 210 by surrounding the bottom of the barrel 210 and horizontally extending the footprint of the barrel 210.

The signaling mechanism 230 may comprise a crossbar 232, the STOP paddle 246, and the SLOW paddle 248. The crossbar 232 may be a horizontally-oriented shaft. The crossbar 232 may comprise a pivot shaft 234 that projects downwards from the crossbar 232. The crossbar 232 may rotate around the pivot shaft 234 within a horizontally-oriented plane. The pivot shaft 234 may be off-center such that the pivot shaft 234 defines a first segment 236 of the crossbar 232 and a second segment 238 of the crossbar 232. The first segment 236 may be longer than the second segment 238. The STOP paddle 246 may be coupled to the top of the crossbar 232 at the distal end of the first segment 236 and the SLOW paddle may be coupled to the top of the crossbar 232 at the distal end of the second segment 238. In some embodiments, the second segment 238 may comprise a counterweight to balance the crossbar at the pivot shaft 234. Because of the difference in length between the first segment 236 and the second segment 238, the barrel 210 may be placed along a lane of travel 900 such that the STOP paddle 246 passes over the lane of travel 900 during rotations of the crossbar 232 and the SLOW paddle 248 remains on the side of the lane of travel 900 during rotations of the crossbar 232.

An individual signal paddle selected from the STOP paddle 246 and the SLOW paddle 248 may comprise an obverse side 240 and a reverse side 244. The obverse side 240 may comprise indicia 242 to convey a message to the oncoming traffic. The reverse side 244 may be a solid color to minimize distractions. As non-limiting examples, the STOP paddle 246 may be an octagonal shape with the word STOP in white letters on a red background on the obverse side 240 and the SLOW paddle 248 may be a diamond shape with the word SLOW in black letters on a yellow background on the obverse side 240.

The individual signal paddle may be coupled to the crossbar such that the individual signal paddle is coplanar with the crossbar 232 and the indicia 242 of the individual signal paddle located to the left of the barrel 210 is visible to the oncoming traffic. As a non-limiting example, with the barrel 210 placed to the right side of the lane of travel 900 and the crossbar 232 rotated to an orientation that is perpendicular to the lane of travel 900 with the STOP paddle 246 extended out over the lane of travel 900, the obverse side 240 of the STOP paddle 246 may be visible to the left of the barrel 210 and the reverse side 244 of the SLOW paddle 248 may be visible to the right of the barrel 210. In this case, the oncoming traffic may see a STOP sign over the lane of travel 900 and no message on the SLOW paddle 248. By rotating the crossbar 232 by 180 degrees, the obverse side 240 of the SLOW paddle 248 may be visible between the lane of travel 900 and the barrel 210 and the reverse side 244 of the STOP paddle 246 may be visible to the right of the barrel 210. In this case, the oncoming traffic may see a SLOW sign next to the lane of travel 900 and no message on the STOP paddle 246.

The motor 250 may convert electrical energy into mechanical energy. The motor 250 may cause rotation of the pivot shaft 234 when the electrical energy is applied to the motor 250. The electrical energy applied to the motor 250 may be controlled by the controller 252. Rotation of the pivot shaft 234 may change the orientation of the crossbar 232. The motor 250 may comprise a position sensor such that the controller 252 may determine the orientation of the crossbar 232.

The controller 252 may be a microprocessor-based circuit for controlling the sequencing and timing of the motor 250, the camera 254, and the first transceiver 256. As non-limiting examples, the controller 252 may send and receive messages via the first transceiver 256, may capture images from the camera 254, and may energize and de-energize the motor 250.

The camera 254 may be an optical instrument that captures still images and/or records motion video. The camera 254 may pass the still images and/or the motion video to the controller 252.

The first transceiver 256 may be operable to send and receive digital messages over the wireless link 290. The first transceiver 256 may acquire the messages to be sent from the controller 252. The first transceiver 256 deliver received messages to the controller 252. As non-limiting examples, the digital messages may comprise commands to remote the crossbar 232, status reports regarding the invention 100, the still images and/or motion video acquired from the camera 254, or any combination thereof.

The one or more batteries 202 may comprise one or more energy-storage devices. The one or more batteries 202 may be a source of electrical energy to operate the controller 252, the motor 250, and the camera 254. The one or more batteries 202 may be rechargeable and/or replaceable.

The remote control 260 may be operable to control the barrel from the remote location. As a non-limiting example, the remote control 260 may be located inside of the stationary vehicle 922 where the human flagger may sit in comfort away from the hazards of the construction zone to monitor and control the barrel 210. The remote control 260 may comprise the computerized device 262 and a second transceiver 264. The computerized device 262 may communicate with the controller 252 in the barrel 210 by sending and receiving the digital messages over the wireless link 290 between the first transceiver 256 and the second transceiver 264. As a non-limiting example, the computerized device 262 may be a laptop computer.

The computerized device 262 may execute an application program that is specific to the operation of the invention 100. As non-limiting examples, the application program may be adapted to show the still images and/or motion video acquired by the camera 254 on the display screen of the computerized device 262, may present control interfaces for rotating the crossbar 232, and may track the amount of time that the crossbar 232 remains in a given orientation.

In some embodiments, the computerized device 262 may comprise a timer such that the computerized device 262 may automatically change the orientation of the crossbar 232 after a timed interval without the intervention of the human flagger.

The two or more remotely controlled signs may be operable to control the flow of traffic through the single open lane of the construction zone by placing a first remotely controller traffic safety sign 272 and a second remotely controller traffic safety sign 274 at opposite ends of the single open lane. The first remotely controller traffic safety sign 272 and the second remotely controller traffic safety sign 274 may be on opposite sides of the lane of travel 900 and both may be oriented to face away from the construction zone. Both the first remotely controller traffic safety sign 272 and the second remotely controller traffic safety sign 274 may be positioned on the right side of the lane of travel 900 from the perspective of the oncoming traffic approaching the construction zone. The two or more remotely controlled signs may be controlled such that either the first remotely controller traffic safety sign 272 or the second remotely controller traffic safety sign 274 but not both are configured to display the SLOW paddle 248. Transitions of the first remotely controller traffic safety sign 272 and the second remotely controller traffic safety sign 274 may comprise an interval during which both the first remotely controller traffic safety sign 272 and the second remotely controller traffic safety sign 274 display the STOP paddle 246 so that the flow of traffic from a first direction may clear the construction zone before the flow of traffic from a second direction is permitted into the construction zone.

In some embodiments, the camera 254 located within the barrel 210 may be augmented by one or more supplemental cameras 280. The one or more supplemental cameras 280 may be operable to send supplemental camera still images and/or supplemental camera motion video to the remote control 260 via the second transceiver 264 where the supplemental camera still images and/or the supplemental camera motion video may be shown on the display of the computerized device 262. An individual supplemental camera selected from the one or more supplemental cameras 280 may be coupled to an existing pole or to a temporary pole. As a non-limiting example, the existing pole may be a telephone pole adjacent to the construction zone.

In use, the first remotely controller traffic safety sign 272 may be placed at a first end of the construction zone such that the first remotely controller traffic safety sign 272 is to the right of the oncoming traffic travelling in a first direction and the second remotely controller traffic safety sign 274 may be placed at a second end of the construction zone and on the opposite side of the lane of travel 900 such that the second remotely controller traffic safety sign 274 is to the right of the oncoming traffic travelling in a second direction that is opposite to the first direction. A human flagger, located at a remote location, may operate the remotely controlled signs 200 using the computerized device 262 to send digital messages to the remotely controlled signs 200 via the wireless link 290. The human flagger may repeatedly sequence rotations of the first remotely controller traffic safety sign 272 and the second remotely controller traffic safety sign 274 to safely stop and reverse the traffic flow through a single open lane. In some embodiments, sequencing of the rotations may be automatically timed and conducted by the computerized device 262.

The configuration of the remotely controlled signs 200 may be expanded to include more than two of the remotely controlled signs 200 and all may be controlled from the remote location. As a non-limiting example, more than two of the remotely controlled signs 200 may be needed to handle traffic on a main street and traffic coming from side streets.

Definitions

Unless otherwise stated, the words “up”, “down”, “top”, “bottom”, “upper”, and “lower” should be interpreted within a gravitational framework. “Down” is the direction that gravity would pull an object. “Up” is the opposite of “down”. “Bottom” is the part of an object that is down farther than any other part of the object. “Top” is the part of an object that is up farther than any other part of the object. “Upper” may refer to top and “lower” may refer to the bottom. As a non-limiting example, the upper end of a vertical shaft is the top end of the vertical shaft.

As used in this disclosure, an “aperture” may be an opening in a surface or object. Aperture may be synonymous with hole, slit, crack, gap, slot, or opening.

As used in this disclosure, an “application” or “app” may be software that is designed to perform one or more specific tasks on a personal computing device, smart phone, or some other computing device.

Throughout this document the terms “battery”, “battery pack”, and “batteries” may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a “camera” may be a sensor that converts light into electric signals that encode the spatial orientation of the captured light in a manner that reproduces the images seen by a human eye.

As used herein, “construction drum” may refer to a traffic control device that may be used to direct motor vehicle traffic 2 through a construction zone or to warn motorists of construction activity near the roadway. Construction drums are typically bright orange in color and may comprise alternating white and orange reflective bands. Construction drums may comprise a stepped shape that is narrower at the top than at the bottom such that the drums may stack for storage and transportation. Construction drums may also be referred to as "construction barrels" or "traffic barrels".

As used herein, the words "couple", "couples", "coupled" or "coupling", may refer to connecting, either directly or indirectly, and does not necessarily imply a mechanical connection.

As used herein, "deploy" may refer to configuring a device to place the device into service or to make the device ready for service. As non-limiting examples, "deployed" may be synonymous with extended, unfolded, inflated, erected, or activated. As non-limiting examples, a device that is not deployed may be referred to as retracted, folded, deflated, withdrawn, collapsed, stowed, or deactivated.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, "energize" and/or "energization" may refer to the application of an electrical potential to a system or subsystem. "De-energize" and/or "de-energization" may refer to the removal of the electrical potential.

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the term "indicia" may refer to a set of markings that identify a sentiment.

As used in this disclosure, a "laptop computer" may be a computer that incorporates into a single housing: 1) a mechanism to provide tactile inputs; 2) a mechanism to provide visual and audio outputs; 3) a mechanism to receive digital or analog inputs from an external mechanical device; and, 4) a mechanism to provide digital or analog outputs to an external mechanical device. The single housing is sized such that the laptop computer can be transported by a single person.

As used in this disclosure, "orientation" may refer to the positioning and/or angular alignment of a first object relative to a second object or relative to a reference position or reference direction.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, the term "shaft" may be used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "transceiver" may be a device that is used to transmit and/or receive signals. The signals may be audible, optical, or RF in nature.

As used in this disclosure, "vertical" may refer to a direction that is parallel to the local force of gravity. Unless specifically noted in this disclosure, the vertical direction is always perpendicular to horizontal.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A remotely controlled traffic safety signs comprising:

a remotely controlled sign and a remote control;

wherein the remotely controlled sign is placed at a transition area of a construction zone to control the flow of traffic in one direction;

wherein the remotely controlled sign comprises a signaling mechanism that presents a STOP paddle or a SLOW paddle to oncoming traffic;

wherein two or more remotely controlled signs are deployed to reverse the flow of traffic over a single open lane of the construction zone;

wherein the remotely controlled signs are controlled by the remote control from a remote location via a wireless link;

wherein the remotely controlled sign is further defined with a barrel, the signaling mechanism, a motor, a controller;

wherein the signaling mechanism is located on the top of the barrel and is rotated by the motor under control of the controller;

wherein the top center of the barrel comprises a crossbar aperture through which the signaling mechanism extends;

wherein the signaling mechanism further comprises a crossbar, the STOP paddle, and the SLOW paddle;

wherein the crossbar is a horizontally-oriented shaft;

wherein the crossbar comprises a pivot shaft that projects downwards from the crossbar;

wherein the crossbar rotates around the pivot shaft within a horizontally-oriented plane;

wherein the barrel internally includes a ballast cavity located at the bottom of the barrel;

wherein the ballast cavity is filled with ballast to stabilize the barrel.

2. The remotely controlled traffic safety signs according to claim 1 wherein the remotely controlled sign further comprises a camera, a first transceiver, and one or more batteries;

wherein the camera is adapted to provide a view of the oncoming traffic to a human flagger located at the remote location.

3. The remotely controlled traffic safety signs according to claim 2 wherein the barrel is a vertically-oriented cylindrical enclosure for the controller, the camera, the first transceiver, and the one or more batteries;

wherein the barrel internally comprises an equipment cavity located at the top of the barrel;

wherein the controller, the camera, the first transceiver, and the one or more batteries and are mounted within the equipment cavity.

4. The remotely controlled traffic safety signs according to claim 3 wherein the side of the barrel comprises a camera aperture through which the camera views the oncoming traffic;

wherein the top of the ballast cavity comprises a fill port through which the ballast is added to the ballast cavity;

wherein the bottom of the ballast cavity comprises a drain port through which the ballast is removed from the ballast cavity;

wherein the drain port is sealed by a drain plug during use.

5. The remotely controlled traffic safety signs according to claim 4 wherein a barrel tire ring is operable to further stabilize the barrel by surrounding the bottom of the barrel and horizontally extending the footprint of the barrel.

6. The remotely controlled traffic safety signs according to claim 4 wherein the pivot shaft is off-center such that the pivot shaft defines a first segment of the crossbar and a second segment of the crossbar;

wherein the first segment is longer than the second segment;

wherein the STOP paddle is coupled to the top of the crossbar at the distal end of the first segment and the SLOW paddle is coupled to the top of the crossbar at the distal end of the second segment;

wherein the barrel is placed along a lane of travel such that the STOP paddle passes over the lane of travel during rotations of the crossbar and the SLOW paddle remains on the side of the lane of travel during rotations of the crossbar.

7. The remotely controlled traffic safety signs according to claim 6 wherein an individual signal paddle selected from the STOP paddle and the SLOW paddle comprises an obverse side and a reverse side;

wherein the obverse side comprises indicia to convey a message to the oncoming traffic.

8. The remotely controlled traffic safety signs according to claim 7 wherein the STOP paddle is an octagonal shape with the word STOP in white letters on a red background on the obverse side;

wherein the SLOW paddle id a diamond shape with the word SLOW in black letters on a yellow background on the obverse side.

9. The remotely controlled traffic safety signs according to claim 8 wherein the individual signal paddle is coupled to the crossbar such that the individual signal paddle is coplanar with the crossbar and the indicia of the individual signal paddle located to the left of the barrel is visible to the oncoming traffic.

10. The remotely controlled traffic safety signs according to claim 9 wherein the motor converts electrical energy into mechanical energy;

wherein the motor causes rotation of the pivot shaft when the electrical energy is applied to the motor;

wherein the electrical energy applied to the motor is controlled by the controller;

wherein rotation of the pivot shaft changes the orientation of the crossbar.

11. The remotely controlled traffic safety signs according to claim 10 wherein the motor comprises a position sensor such that the controller determines the orientation of the crossbar.

12. The remotely controlled traffic safety signs according to claim 10 wherein the controller is a microprocessor-based circuit for controlling the sequencing and timing of the motor, the camera, and the first transceiver.

13. The remotely controlled traffic safety signs according to claim 12 wherein the camera is an optical instrument that captures still images and/or records motion video;

wherein the camera passes the still images and/or the motion video to the controller.

14. The remotely controlled traffic safety signs according to claim 13 wherein the first transceiver is operable to send and receive digital messages over the wireless link;

wherein the first transceiver acquires the messages to be sent from the controller;

wherein the first transceiver delivers received messages to the controller.

15. The remotely controlled traffic safety signs according to claim 14 wherein the one or more batteries comprise one or more energy-storage devices;

wherein the one or more batteries are a source of electrical energy to operate the controller, the motor, and the camera;

wherein the one or more batteries are rechargeable and/or replaceable.

16. The remotely controlled traffic safety signs according to claim 15 wherein the remote control is operable to control the barrel from the remote location;

wherein the remote control comprises a computerized device and a second transceiver;

wherein the computerized device communicates with the controller in the barrel by sending and receiving the digital messages over the wireless link between the first transceiver and the second transceiver.

17. The remotely controlled traffic safety signs according to claim 16 wherein the computerized device executes an application program that is specific to the operation of the remotely controlled traffic safety signs.

18. The remotely controlled traffic safety signs according to claim 17 wherein the computerized device comprises a timer such that the computerized device automatically changes the orientation of the crossbar after a timed interval.

19. The remotely controlled traffic safety signs according to claim 17 wherein the two or more remotely controlled signs are operable to control the flow of traffic through the single open lane of the construction zone by placing a first remotely controller traffic safety sign and a second remotely controller traffic safety sign at opposite ends of the single open lane;

wherein the first remotely controller traffic safety sign and the second remotely controller traffic safety sign are on opposite sides of the lane of travel and both are oriented to face away from the construction zone;

wherein both the first remotely controller traffic safety sign and the second remotely controller traffic safety sign are positioned on the right side of the lane of travel from the perspective of the oncoming traffic approaching the construction zone;

wherein the two or more remotely controlled signs are controlled such that either the first remotely controller traffic safety sign or the second remotely controller traffic safety sign but not both are configured to display the SLOW paddle;

wherein transitions of the first remotely controller traffic safety sign and the second remotely controller traffic safety sign comprise an interval during which both the first remotely controller traffic safety sign and the second remotely controller traffic safety sign display the STOP paddle so that the flow of traffic from a first direction clears the construction zone before the flow of traffic from a second direction is permitted into the construction zone.

20. The remotely controlled traffic safety signs according to claim 19 wherein the camera located within the barrel is augmented by one or more supplemental cameras;

wherein the one or more supplemental cameras are operable to send supplemental camera still images and/or supplemental camera motion video to the remote control via the second transceiver where the supplemental camera still images and/or the supplemental camera motion video are shown on the display of the computerized device;

wherein the motor is either positioned on top of the barrel or is located inside of the barrel.

* * * * *